(12) United States Patent
Moran

(10) Patent No.: US 6,419,247 B1
(45) Date of Patent: Jul. 16, 2002

(54) AUXILIARY AXLE ASSEMBLY

(76) Inventor: Robert R. Moran, 3188 Main St., Emmett, MI (US) 48022

( * ) Notice: Subject to any disclaimer, the term of this patent is extended or adjusted under 35 U.S.C. 154(b) by 0 days.

(21) Appl. No.: 09/690,293

(22) Filed: Oct. 17, 2000

Related U.S. Application Data

(60) Provisional application No. 60/162,648, filed on Nov. 1, 1999.

(51) Int. Cl.$^7$ ................................................ B62D 61/12
(52) U.S. Cl. ..................................... 280/86.5; 280/476.1
(58) Field of Search ........................... 280/476.1, 405.1, 280/406.1, 406.2, 407, 407.1, 86.5, 767; 180/209

(56) References Cited

U.S. PATENT DOCUMENTS

| | | | | |
|---|---|---|---|---|
| 2,570,482 A | * | 10/1951 | Pruitt | |
| 2,634,986 A | * | 4/1953 | McDaniel | |
| 3,865,405 A | * | 2/1975 | Mitchell et al. | |
| 4,162,082 A | * | 7/1979 | Curry | |
| 4,253,679 A | * | 3/1981 | Sargent | |
| 5,531,468 A | * | 7/1996 | White | |
| 6,224,083 B1 | * | 5/2001 | Tyler | |
| 6,290,248 B1 | * | 9/2001 | Yrigoyen | |

* cited by examiner

*Primary Examiner*—Kevin Hurley
(74) *Attorney, Agent, or Firm*—John R. Benefiel

(57) ABSTRACT

An auxiliary axle assembly in which a pair of pivoted swing arms, each supporting a wheel are mounted to a frame member to extend downwardly and outwardly therefrom. Controllably pressurized air springs are mounted to a respective swing arm to set a desired level of the axle assembly when hitched to a loaded vehicle. The wheels swing on the arms to automatically align with the radius of a turn arc.

6 Claims, 4 Drawing Sheets

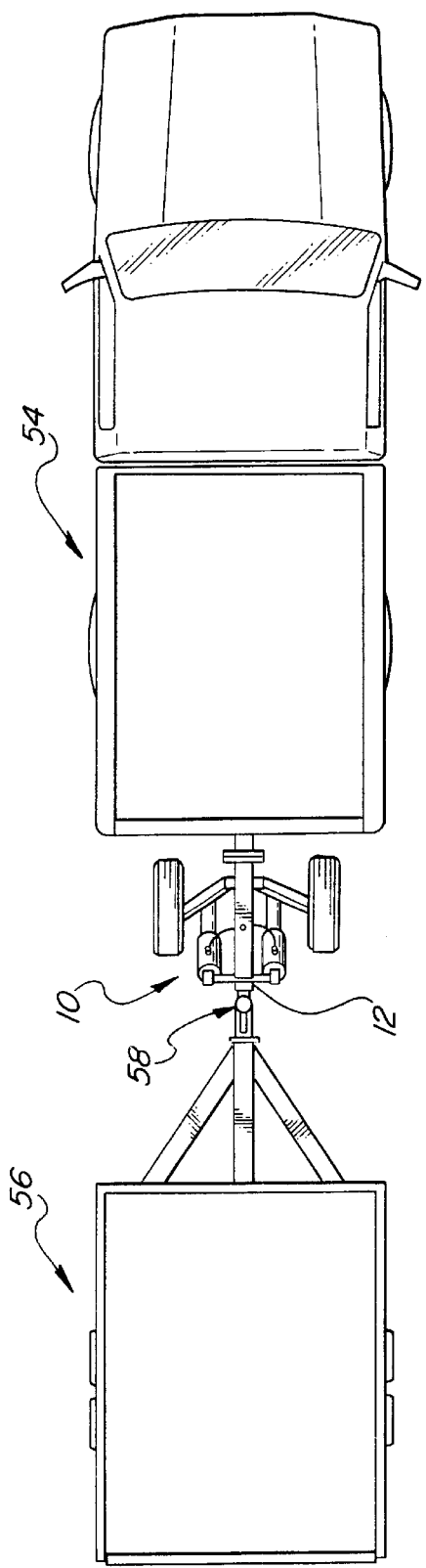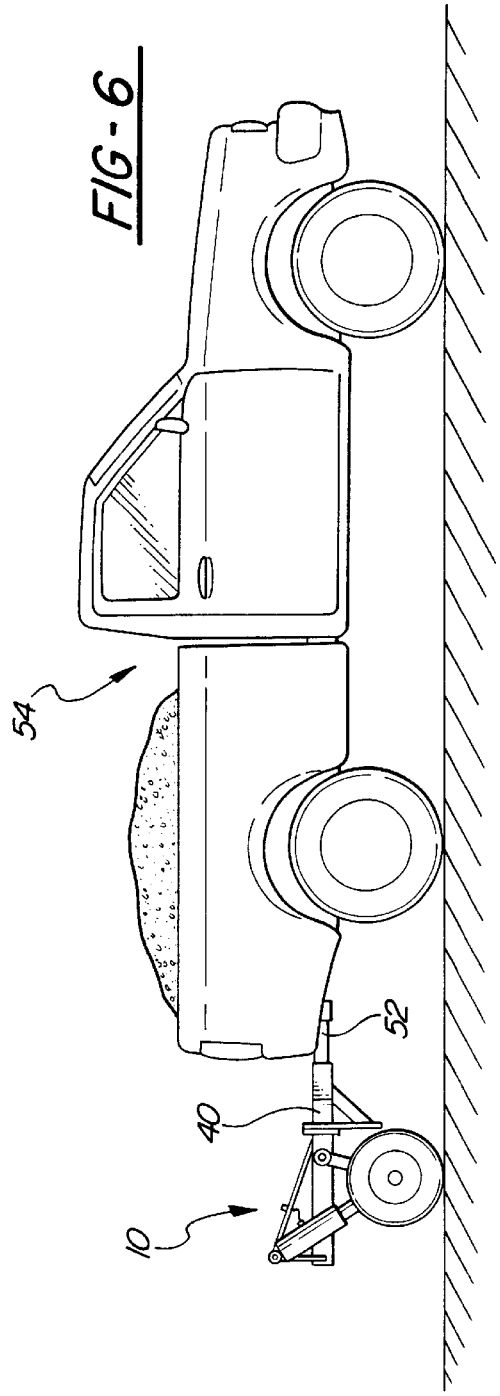

AUXILIARY AXLE ASSEMBLY

CROSS REFERENCE TO RELATED APPLICATION

This application claims the benefit of U.S. provisional patent application Ser. No. 60/162,648, filed Nov. 1, 1999.

BACKGROUND OF THE INVENTION

This invention concerns auxiliary axle assemblies which have been used to augment the load carrying ability of vehicles, when heavily loaded or when towing a trailer. Many such "tag" axles have been devised in the past.

A prime consideration has been the effect such auxiliary axles have on steering. The prior designs typically create tire scrubbing when turning due to the fact that the inside and outside wheels do not align with the radius of the turn since the axle wheels are constrained by their mounting to the axle to remain in alignment with each other rather than to align with the turn radius.

When used to tow a trailer, the trailer load often results in bending forces being imposed on the tag axle frame which can become excessive particularly on a rough road.

Many of the prior tag axle designs are bulky and complicated and create instability when used to tow a vehicle.

It is the object of the present invention to provide a simple and compact auxiliary axle assembly which contributes to vehicle stability in turns and which assumes a controllable proportion of the towed vehicle load without being subjected to excessive bending stress.

SUMMARY OF THE INVENTION

The above recited object and others which will become apparent upon a reading of the following specification and claims are accomplished by an auxiliary axle assembly comprising a central frame member preferably comprising a square tube piece having a pair of downwardly inclined swing arms each pivotally supported on one side of the frame and normally inclined to trail to the rear. The outer end of each swing arm mounts a wheel-tire assembly including wheel bearings for rotational support thereof.

A selectively pressurizable air spring is pivotally mounted at one end to each swing arm and at the other end to a bracket fixed to the frame member to support each swing arm under the weight of the supported load.

A hitch is welded to an attachment plate, which is adjustably mounted to a forward end of the frame member.

The hitch is adjusted to the approximate height of the hitch receiver of the towing vehicle, and the air springs pressurized to a level accurately aligning the hitch and hitch receiver and enable mounting thereof.

When the vehicle is loaded, the air springs are pressurized to raise the vehicle and axle to its normally unloaded height to insure proper steering and cause the auxiliary axle to partially. assume the vehicle load.

The auxiliary axle assembly when so loaded has been found to track the steering radius by relative movement of the respective swing arms to align the wheels along the radius of the turning arc to eliminate tire scrubbing and improve vehicle stability.

This simple rugged and compact design can be easily and quickly installed and manufactured at low cost.

DESCRIPTION OF THE DRAWINGS

FIG. 5 is a plan view of a towing vehicle and towed trailer coupled to an auxiliary axle assembly according to the present invention.

FIG. 6 is a side elevational view of a vehicle hitched to an auxiliary axle assembly according to the present invention.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
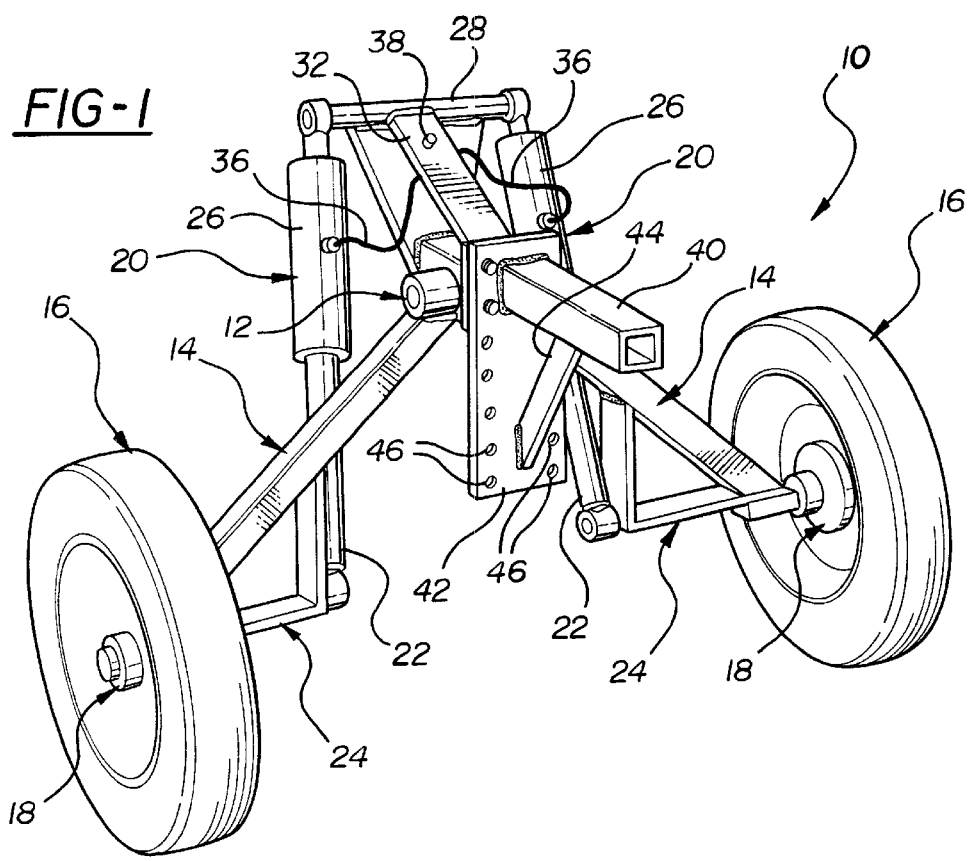
FIG. 1 is a perspective view of an auxiliary axle assembly according to the present invention.
Figure 2:
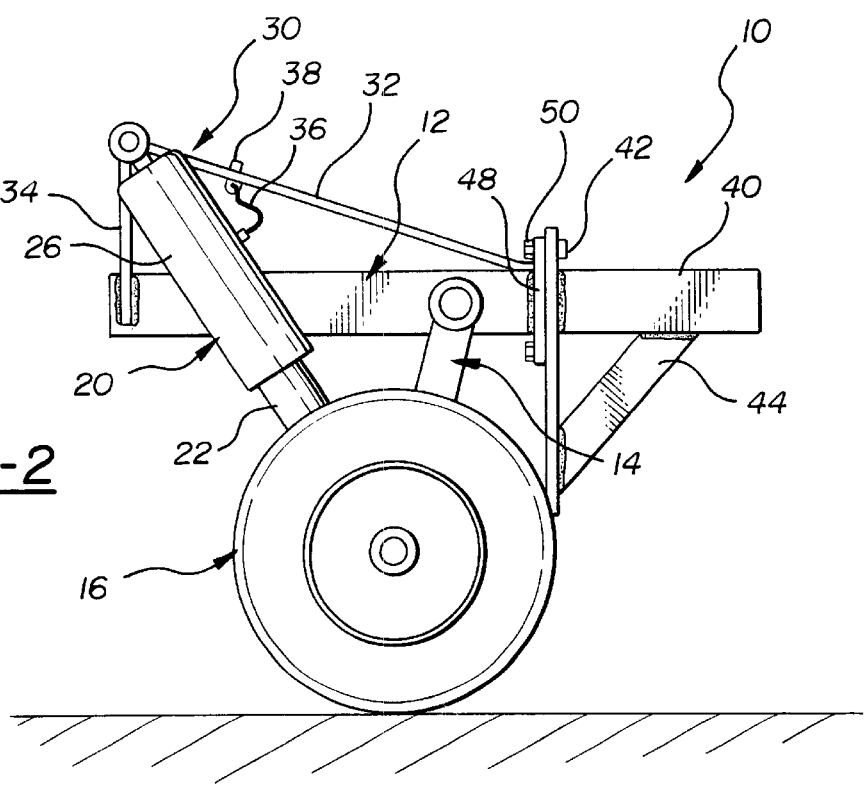
FIG. 2 is a side elevational view of the auxiliary axle assembly 10, shown in FIG. 1.
Figure 3:
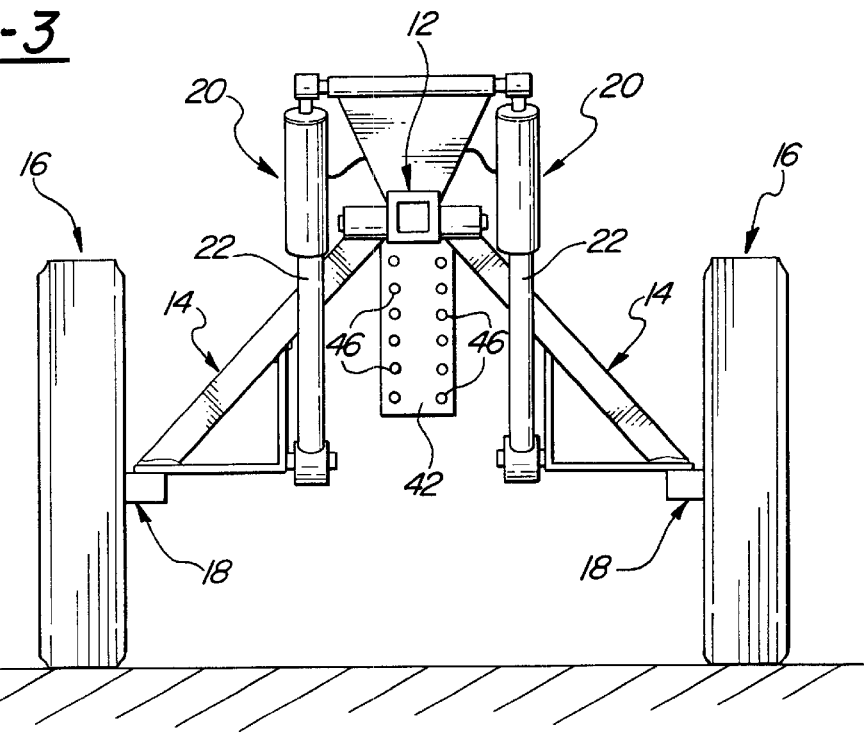
FIG. 3 is a rear view of the auxiliary axle assembly shown in FIGS. 1 and 2.

Referring to the drawings, particularly FIGS. 1–3, an auxiliary axle assembly 10 according to the present invention is shown, which includes a elongated central frame member 12, preferably taking the form of a heavy walled steel square tube piece. An outwardly angled swing arm 14 extends downwardly from each side of the frame member 12, pivotally mounted thereto at one end.

A tire and wheel assembly 16 is rotatably supported on a hub-spindle assembly 18 supported on the lower outer end of each swing arm 14.

Each pressurizable air spring 20 has a protruding extendible rod 22 pivotally mounted to an associated bracket 24 fixed to respective swing arm 14.

An opposite end of an air spring cylinder 26 of each air spring 20 is pivotally held on a shaft 28 welded to a support bracket 30 formed by a vertical plate 34 and forwardly angled plate 32 both welded to central frame member 12.

Pressure hoses 36 from each air cylinder 26 are connected to a common fitting 38 mounted on bracketing plate 32 to enable simultaneous pressurizing both of the air springs 20.

A hitch bar 40 projects forwardly from an attachment plate 42 with a welded brace 44 insuring adequate strength for secure support of vertical loads for adapters over eight inches high. This is a commercially available pintail hitch adapter.

The attachment plate 42 has a uniformly spaced series of holes 46 formed along each side. A plate 48 is welded to the front end of the frame member 12 formed with four holes receiving nut and bolt sets 50 which also pass through four of the holes 46. This allows vertical adjustment of the attachment plate 42 and hitch tube to the approximate level of the hitch receiver 52 (FIG. 6) mounted to the frame of the vehicle 54. Other adjustment bolt patterns may be used.

The pressure in the air springs 20 is adjusted to accurately align the hitch tube 40 with the hitch receiver 52 to allow mating and attachment thereto.

When the vehicle 54 is loaded, the air springs 20 are pressurized to bring the vehicle 54 to its unloaded level condition. This causes the auxiliary axle assembly 10 to assume the weight of the load of the vehicle 54.

Thus vehicle steering will remain effective due to the level condition of the vehicle 54.

Figure 4:
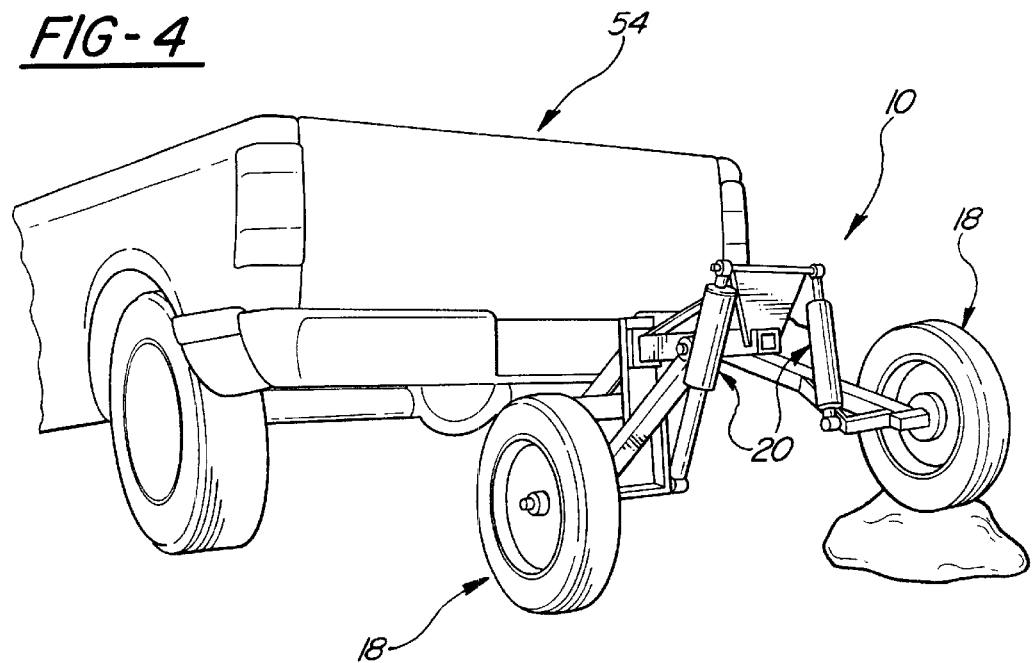
FIG. 4 is a rear perspective view of the auxiliary axle assembly shown in FIGS. 1–3 hitched to a towing vehicle shown in fragmentary form, with one wheel traversing a road bump to illustrate its independent swing motion capability.

The wheel assemblies 18 are individually suspended as shown in FIG. 4, such that one can react to a bump without causing twisting of axle assembly 10 as a whole.

Figure 7:
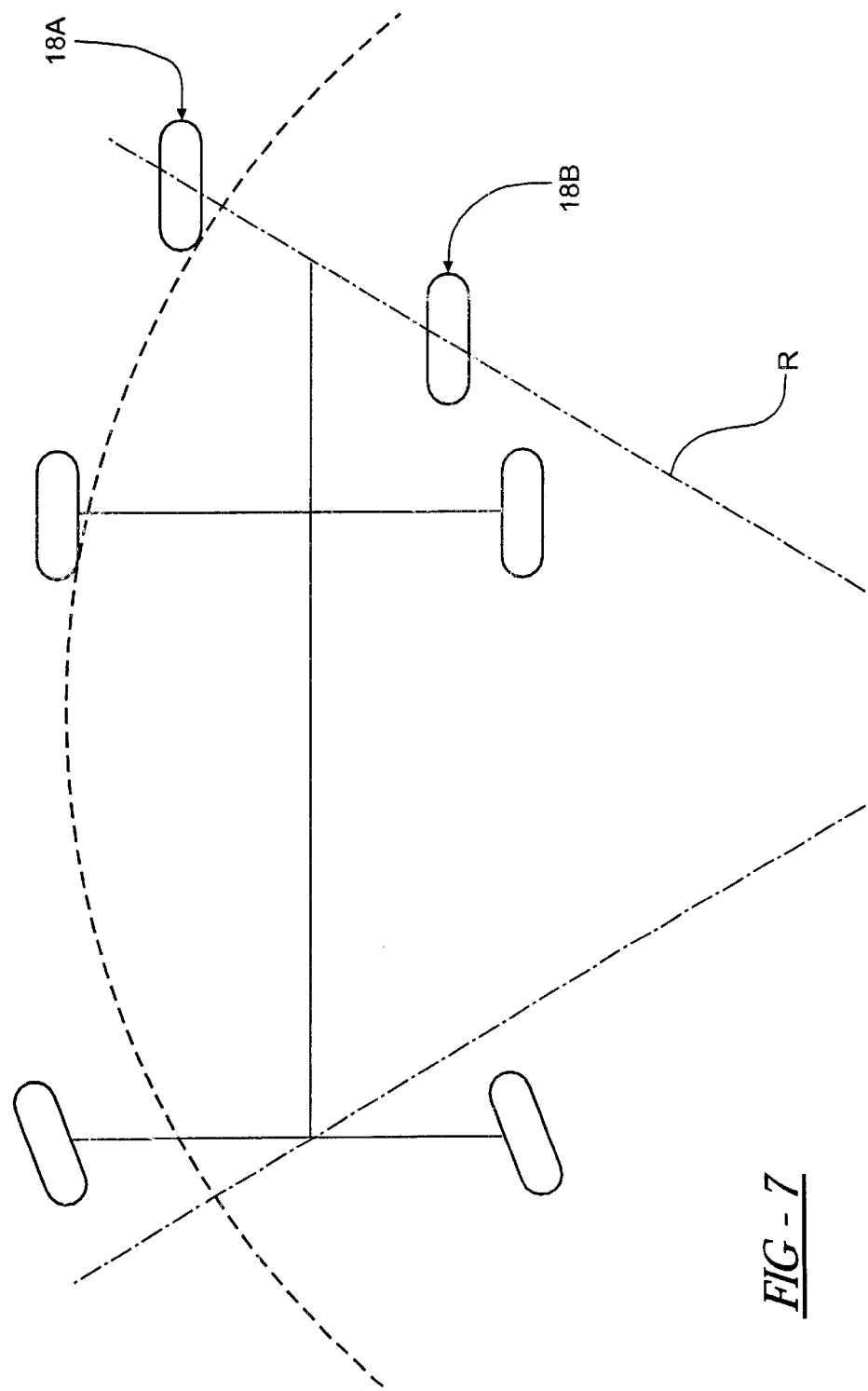
FIG. 7 is a plan view diagram showing the swing arm turning correction undergone by the wheels of the auxiliary axle assembly according to the invention.

It has been found that this mounting of the wheel assemblies will contribute to the steering stability by allowing the outside tire wheel assembly 18 to trail the inside wheel assembly as it is unweighted in the turn, as indicated diagrammatically in FIG. 7. That is, the unweighted inside tire wheel assembly 18B will swing to a more vertical position on its swing arm 14 than the more weighted outside tire wheel assembly 18A. This carries the outside tire wheel assembly 18A to a trailing position relative inside tire wheel assembly 18B. This results in a more close alignment with the radius of the turn arc, which in turn minimizes dragging of the tires and improves handling.

FIG. 5 shows use of the auxiliary axle assembly 10 with a trailer 56, by utilizing the rear end of the central frame member 12 as a hitch receiver for the trailer hitch 58 with similar benefits.

The compact rugged construction reduces stresses and improves performance.

What is claimed is:

1. An auxiliary axle assembly;
   a central frame having a forward end and a rear end;
   a pair of swing arms each pivotally mounted at one end to one side of said frame to be able to swing on said frame, extending in an opposite direction from each other and downwardly and outwardly from said frame;
   a pair of pressurizable air springs each mounted at one end to a respective swing arm and at the other end to said frame to resiliently resist swinging movement of said swing arms, each swing arm normally inclined downwardly and extending towards said rear end of said frame;
   a pair of wheel-tire assemblies each rotatably mounted to a lower end of a respective swing arm; and
   a vehicle hitch attached to one end of said vehicle frame.

2. The auxiliary axle assembly according to claim 1 further including an attachment plate for said hitch which is adjustable vertically on said frame to allow said hitch to be positioned at a height more closely corresponding to a vehicle hitch receiver height.

3. The auxiliary axle assembly according to claim 2 further including a common pressure fitting connected to air lines to said air springs enabling simultaneous pressurization of said air springs to allow setting of said auxiliary axle assembly to a selected height.

4. The auxiliary axle assembly according to claim 1 wherein said frame is comprised of a square tube member configured to act as a trailer hitch receiver on an end opposite said one end.

5. The auxiliary axle assembly according to claim 1 wherein bracketing is affixed to a rear end of said frame supporting a shaft above said rear end, an upper end of each air spring pivotally supported on said shaft.

6. The auxiliary axle assembly according to claim 1 wherein a bracket is attached to each swing arm to provide a pivotal connection of each air spring to a respective swing arm at a point intermediate the length thereof and below a main part of said swing arm.

* * * * *